S. HOUGH AND W. LOHR.
AUTOMATIC LUBRICATING SHACKLE BOLT.
APPLICATION FILED JAN. 15, 1920.

1,393,128.

Patented Oct. 11, 1921.
2 SHEETS—SHEET 1.

Inventors
Samuel Hough
and William Lohr
By W. W. Williamson

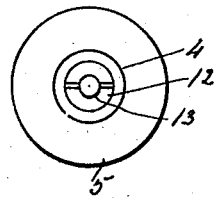
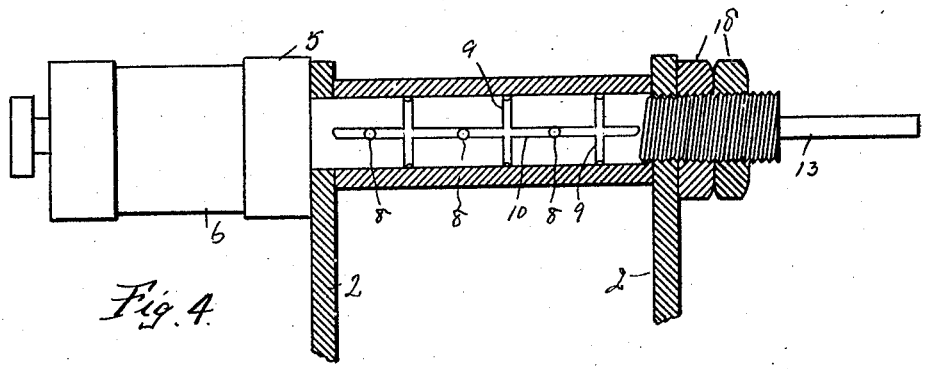
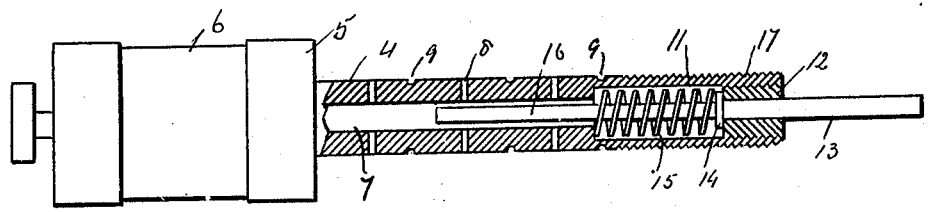

UNITED STATES PATENT OFFICE.

SAMUEL HOUGH AND WILLIAM LOHR, OF PHILADELPHIA, PENNSYLVANIA.

AUTOMATIC LUBRICATING SHACKLE-BOLT.

1,393,128.  Specification of Letters Patent.  Patented Oct. 11, 1921.

Application filed January 15, 1920. Serial No. 351,566.

*To all whom it may concern:*

Be it known that we, SAMUEL HOUGH and WILLIAM LOHR, citizens of the United States, residing at Philadelphia, in the county of Philadelphia and State of Pennsylvania, have invented new and useful Improvements in Automatic Lubricating Shackle-Bolts, of which the following is a specification.

Our invention relates to a new and useful improvement in automatic lubricating shackle bolts, and has for its object to provide an exceedingly simple and effective device of this description which will automatically and positively feed grease to the shackle bolt bearing.

A further object of our invention is to provide for the automatic feeding of grease to the interior of the shackle bolt from one end thereof and from the opposite end to so operate a plunger within said bolt as to displace a given amount of grease for each stroke thereof and the grease so displaced being replaced by the feed mechanism.

A still further object of our invention is to provide for the actuation of the plunger from the movements of the spring carrying the shackle bolts.

With these ends in view, this invention consists in the details of construction and combination of elements hereinafter set forth and then specifically designated by the claim.

In order that those skilled in the art to which this invention appertains may understand how to make and use the same, we will describe its construction in detail, referring by numerals to the accompanying drawings forming a part of this application, in which:—

Fig. 3, is an end view of a shackle bolt before being applied to the shackle.

Fig. 4, is a section of a shackle bolt applied thereto.

Fig. 5, is an elevation partly in section of our improved shackle bolt.

Figure 1:
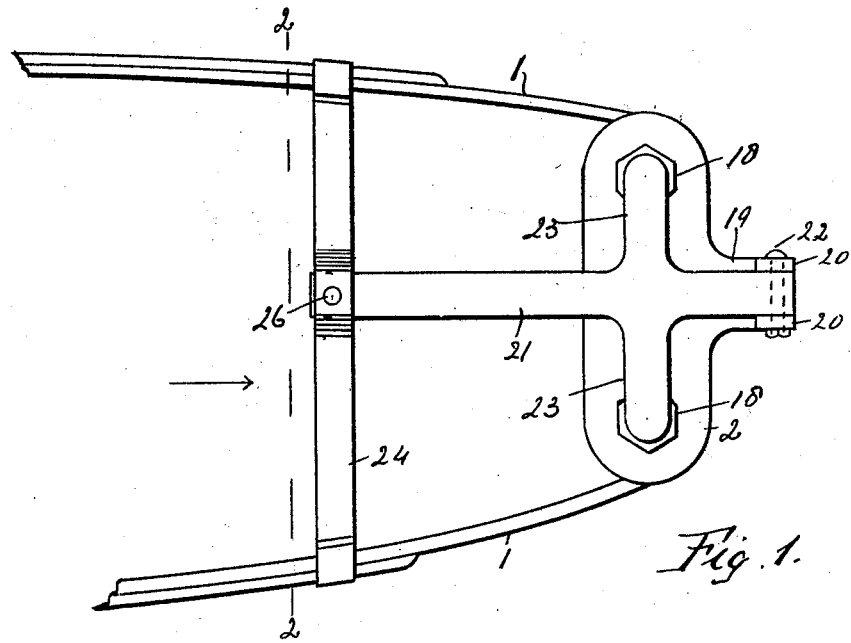
Figure 1, is a side elevation of a portion of a spring such as are used in automobiles and the like showing our improvement applied thereto.

In carrying out our invention as here embodied, 1 represents a spring such as used in automobile and like constructions the ends of the sections of the same being connected together by the shackle links 2 which are spaced by the shackle barrel 3 in the usual manner.

4 represents a shackle bolt having formed therewith or secured thereto the internally threaded head 5 which serves as the bottom of the grease cup 6 the latter being of any suitable construction having spring actuating mechanism therein for automatically forcing grease into the bore 7 of the shackle bolt.

The shackle bolt is provided with a series of holes 8 leading from the bore 7 to the exterior of said bolt and this bolt also has the channelways 9 formed around its circumference and these channels if desired may be connected together by a cross channel 10.

The outer portion of the shackle bolt is counterbored so as to produce an enlarged compartment 11 therein and 12 represents a screw plug threaded into the end of this counterbore to inclose the same.

13 represents a plunger rod which is fitted to slide in the screw plug 12 and carries a collar 14 between which the inner end of the counterbore is located in the coil spring 15 for normally holding the plunger rod in its distended position.

16 represents a plunger which extends from the collar 14 through a counterbore into the bore 7 for the purpose hereinafter set forth.

Figure 2:
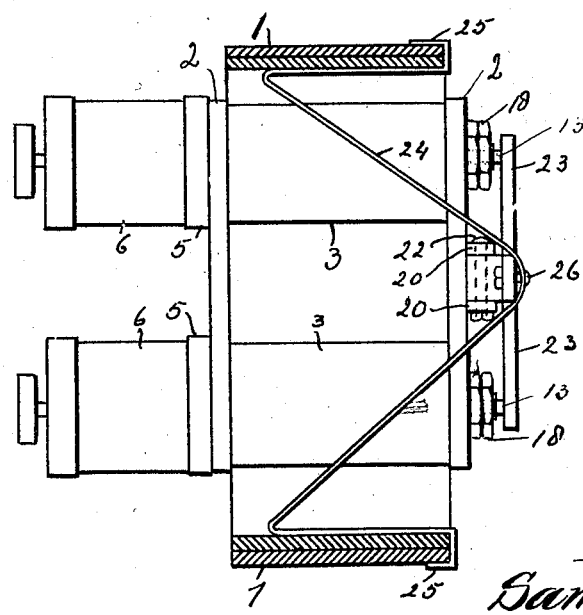
Fig. 2, is a section at the line 2—2 of Fig. 1, looking in the direction of the arrow.

The outer end of the shackle bolt is threaded as indicated at 17 for the reception of the nuts 18 for holding the bolt in place within the shackle in the usual manner, and one of the shackle links 2 has formed therewith an extension 19 carrying the lugs 20 between which the latter is pivoted to the lever 21 by means of the bolt 22. This lever is provided with two arms 23 which extend over the ends of the plunger rods 13 so that when this lever is swung back and forth it will contact with the plunger of the two shackle bolts forcing them inward against the action of their springs 15. In order that the lower 21 may be automatically actuated we provide a spring toggle 24 which in the form of a strip so bent as to produce the clips 25 by means of which its ends are attached to the upper and lower sections of the spring 1 as clearly shown in Figs. 1 and 2 and if found desirable these clips may be further secured by screw clamps or otherwise. The center of the spring toggle is secured to the lever 21 by means of the bolt 26 so that as the sections of the spring are forced toward each other or sprung apart this spring toggle will move the lever 21 back and forth as will be readily understood.

From the foregoing description the operation of our improvement will be obviously as follows:—

As the automobile or other vehicle to which our improvement is applied travels over the road bed the sections of the spring will constantly move to and from each other and in so doing will actuate the lever 21 through the spring toggle as before described and this lever in turn will force the plungers 16 inward against the springs 15 and in so doing will eject a small quantity of grease through the holes 8 and into the shackle bearing and as the plungers 16 are forced outward by their springs a corresponding amount of grease will be fed into the bores 7 from the grease cups 6. This process automatically continuing to supply the shackle and bearings with grease so long as the vehicle is in motion, but when the vehicle comes to rest these operations will cease and consequently no grease will be wasted.

While we have shown our invention as applied to the shackle bolt of an automobile spring it is obvious that it may be equally as well adapted to crank pins or other parts of machinery the only requirements being that some moving part of the machine shall actuate the plunger rods to effect the ejection of a portion of the grease.

Of course we do not wish to be limited to the exact details of construction as herein shown as these may be varied within the limits of the appended claim without departing from the spirit of our invention.

Having thus fully described our invention, what we claim as new and useful is:—

In combination with a spring, including shackles connecting sections of said spring, a lever pivoted to one of the links of said shackle, a spring toggle connecting the sections of the spring with said lever in such manner as to actuate the latter when the sections of the spring move to and from each other, a shackle bolt, a spring actuated plunger rod fitted to said shackle bolt, said rod being adapted to be actuated in one direction by the lever, and a grease cup for automatically feeding grease to the interior of the bolt.

In testimony whereof, we have hereunto affixed our signatures.

SAMUEL HOUGH.
WILLIAM LOHR.